(12) United States Patent
Vogt et al.

(10) Patent No.: US 8,123,373 B2
(45) Date of Patent: Feb. 28, 2012

(54) PEOPLE CONVEYOR GLASS BALUSTRADE LIGHTING

(75) Inventors: Andreas Vogt, Wiedenbrügge (DE);
Frank Wiegand, Nienstaedt (DE);
Frank Kirchhoff, Berlin (DE);
Bernward Engelke, Hildesheim (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 12/877,200

(22) Filed: Sep. 8, 2010

(65) Prior Publication Data
US 2011/0042179 A1 Feb. 24, 2011

Related U.S. Application Data

(63) Continuation of application No. 11/719,545, filed as application No. PCT/EP2004/013453 on Nov. 26, 2004, now abandoned.

(51) Int. Cl.
*F21S 8/00* (2006.01)
*F21S 4/00* (2006.01)
*B66B 31/02* (2006.01)
*F21V 7/04* (2006.01)

(52) U.S. Cl. .......... 362/146; 362/249.05; 362/602; 198/337

(58) Field of Classification Search .......... 362/145, 362/146, 249.05, 249.12, 249.13, 602, 605, 362/612; 198/324, 337
See application file for complete search history.

(56) References Cited

U.S. PATENT DOCUMENTS

| 3,569,689 | A | | 3/1971 | Nestrock |
| 4,756,398 | A | | 7/1988 | Watanabe et al. |
| 5,040,659 | A | | 8/1991 | Saito et al. |
| 5,067,062 | A | | 11/1991 | Rulke |
| 5,099,402 | A | | 3/1992 | Starniri |
| 5,107,408 | A | | 4/1992 | Vernondier |
| 5,268,828 | A | * | 12/1993 | Miura ............ 362/249.06 |
| 5,339,228 | A | | 8/1994 | Baethge et al. |
| 5,366,061 | A | | 11/1994 | Kruse et al. |
| 5,431,271 | A | * | 7/1995 | Abraham et al. ......... 198/324 |
| 5,511,647 | A | | 4/1996 | Adrian et al. |
| 6,129,442 | A | | 10/2000 | Hoefling et al. |
| 6,166,496 | A | * | 12/2000 | Lys et al. .............. 315/316 |
| 6,424,269 | B1 | * | 7/2002 | Pederson .......... 340/815.45 |

(Continued)

FOREIGN PATENT DOCUMENTS

CN 2473709 Y 1/2002

(Continued)

OTHER PUBLICATIONS

International Preliminary Report on Patentability for International application No. PCT/EP2006/004778 mailed Aug. 4, 2008.

(Continued)

*Primary Examiner* — Alan Cariaso
(74) *Attorney, Agent, or Firm* — Carlson, Gaskey & Olds PC

(57) ABSTRACT

People conveyor (2) having an endless people transportation band (4) and an endless handrail (6), a glass balustrade (8) arranged laterally to the transportation band (4) and supporting the handrail (6), and a profile (10, 12) having an U-shaped channel (38) for engaging the glass balustrade (8) and comprising an illumination cavity (44), wherein a plurality of LEDs is arranged in the illumination cavity (44).

15 Claims, 2 Drawing Sheets

U.S. PATENT DOCUMENTS

| | | |
|---|---|---|
| 6,425,676 B1 | 7/2002 | Lyons |
| 6,866,125 B2 * | 3/2005 | Ball et al. ................. 187/391 |
| 7,100,334 B2 | 9/2006 | Milios et al. |
| 7,460,316 B2 | 12/2008 | Kleewein et al. |
| 2004/0201981 A1 | 10/2004 | Pietz |
| 2004/0257800 A1 | 12/2004 | Kleewein et al. |
| 2009/0067162 A1 | 3/2009 | Vogt et al. |

FOREIGN PATENT DOCUMENTS

| | | | |
|---|---|---|---|
| DE | 19957680 | | 6/2001 |
| EP | 0648705 A1 | | 4/1995 |
| JP | 01220693 | | 9/1989 |
| JP | 402023192 A | | 1/1990 |
| JP | 03177297 | | 8/1991 |
| JP | 3259895 A | | 11/1991 |
| JP | 04361979 | | 12/1992 |
| JP | 05097370 | | 4/1993 |
| JP | 7206349 A | | 8/1995 |
| JP | 10167646 | | 6/1998 |
| JP | 2000131688 | | 5/2000 |
| JP | 2003034483 A | | 2/2003 |
| JP | 2003303504 A | | 10/2003 |
| JP | 2004115171 A | * | 4/2004 |
| JP | 2004203619 | | 7/2004 |
| WO | 03093158 A1 | | 11/2003 |
| WO | 2006056224 A2 | | 6/2006 |

OTHER PUBLICATIONS

International Search Report and Written Opinion of the International Searching Authority for International application No. PCT/EP2006/004778 mailed Feb. 1, 2007.

International Preliminary Report on Patentability for International application No. PCT/EP2004/013453 mailed Feb. 20, 2007.

International Search Report and Written Opinion of the International Searching Authority for International application No. PCT/EP2004/013453 mailed Dec. 30, 2005.

* cited by examiner

PEOPLE CONVEYOR GLASS BALUSTRADE LIGHTING

This application is a continuation of the U.S. patent application Ser. No. 11/719,545, which was filed on May 17, 2007, now abandoned which is the national phase of the PCT Application No. PCT/EP2004/013453, which was filed on 26 Nov. 2004.

The present invention relates to people conveyors having an endless people transportation band and an endless handrail, a glass balustrade arranged laterally to the transportation band and supporting the handrail, and a profile for engaging the glass balustrade and comprising an illumination cavity.

People conveyors of this type are known for example from DE 4209 505 C1 and WO 02/20378 A1. Particularly, the people conveyor can be an escalator or moving walkway. Accordingly, the endless people transportation band can comprise a plurality of individual steps or pallets which are arranged one after the other so as to form the endless revolving transportation band. Alternatively, an elastic endless belt can form the transportation band. The handrail is preferably movable together with the endless people transportation band.

Illumination of the glass balustrade is advantageous for safety reasons as well as for aesthetic reasons. "Glass balustrade" in the context of the present application refers to balustrades made of transparent or translucent material which does not necessarily have to be glass. It is particularly advantageous to illuminate the transportation band and particularly the steps in case of an escalator. At present standard escalators have a tube lightening for illuminating the glass balustrade. However, the tube lighting requires substantial space and a slim appealing balustrade design cannot easily be achieved, particularly if it is desired to illuminate the glass balustrade from above, i.e. from under the handrail. The above-mentioned prior art documents and similarly U.S. Pat. No. 6,129,442 suggest to use light-guides for guiding light from a light source to the profile on top of the balustrade. Moreover, such prior art documents suggest to use a transparent material for the profile, particularly if it is desired to illuminate the glass balustrade from the small peripheral or top front side, since a separate illumination cavity is provided within the profile for retaining the light-guide within the profile. Both features, i.e. the transparent profile and the separate required illumination cavity, are generally not present in existing people conveyor installations so that re-equipping of existing people conveyors with under handrail illumination is virtually impossible.

Moreover, the existing systems do not allow separate switching of sections or spots to be illuminated along the glass balustrade which might be desired in order to highlight information as provided on the glass balustrade or for any aesthetic reason.

Another point is that such light-guide systems require very strong illumination sources in order to provide sufficient light intensity along the complete glass balustrade. Such light sources are typically arranged within the upper or lower landings and consume a large amount of space which might not be available in some applications. Typically they also consume a relatively large amount of energy.

It is an object of the present invention to provide a people conveyor of the type as described above, which has a high illumination intensity, requires minimum amount of space for the light source, particularly in the upper an lower landing areas, provides durable and low-energy-consumption light sources, and provides the option for individually switching sections or spots of the illumination along the glass balustrade.

In accordance with an embodiment of the present invention this object is solved by a people conveyor as described above, wherein a plurality of LEDs (light emitting diodes) is arranged in the illumination cavity.

The LEDs are arranged so as to direct the light into the edge or the peripheral face of the glass balustrade and/or into one or both lateral side surfaces thereof. The LEDs are individual light sources which can be switched individually, and as they are distributed along the length of the profile, it is possible to illuminate selected portions of the glass balustrade. The LEDs only require a power source which can be very compact and which can be placed conveniently within the people conveyor. Moreover, the LEDs may have a high illumination density. As compared to lighting tubes, the LEDs consume much less space so that it is possible to re-equip existing profiles with LED glass balustrade illumination. Due to the fact that the LEDs are arranged individually, it is easy to illuminate also the newel bows of the handrail. It is further possible to use LEDs of different colors or LEDs which can produce different colors depending on how they are controlled. Thus it is possible to generate different light and color effects both for aesthetic and warning purposes. The very small voltage required for feeding the LEDs is another advantage of using LEDs. Even if, for whatever reason, the passengers get in contact with the conductors feeding the LEDs, the voltage will do no harm to them. A further advantage is small power consumption by the LEDs and the relatively small heat generation by the LEDs.

Preferably, the profile comprises an U-shaped channel and the illumination cavity is an extension of the U-shaped channel. Alternatively, the profile can be made of a transparent or translucent material and the illumination cavity can be provided separately from the U-shaped channel engaging the glass balustrade. If, however, the illumination cavity is en extension of the U-shaped channel so that the LEDs are in direct optical contact with the glass balustrade, the profile can be made from a material having a good thermal conductivity, for example metal material, and preferably an aluminium or aluminium alloy. Despite that fact that LEDs produce only small amounts of heat, they produce heat which needs to be dissipated. Transparent profiles as mentioned above are made of resin material which typically is not a good thermal conductor. If LEDs are used in a illumination cavity in such a resin profile, and if no means for dissipating thermal energy are provided, the LEDs have to operate at elevated temperatures which might cause premature failure of the LEDs. The use of the LEDs in combination with a profile made from a material having a good thermal conductivity insures good thermal dissipation and reasonable operating temperatures for the LEDs.

Preferably, a potting material is used for mounting the LEDs into the illumination cavity. Generally it is an advantage of the potting material to position the LEDs securely within the illumination cavity, since this facilitates assembling the people conveyor. Moreover, by using the potting material the LEDs are fixed in place so that the illumination direction thereof will be maintained. Preferably, the potting material is any kind of plastics material. It may be a flexible material in the hardened condition which allows for easy installation of the pottered LEDs into the profile and facilities flexing of the profile for example in the newel portion. For example an epoxy resin can be used.

It is possible to pot the LEDs in the potting material outside the body of the light profile and to assemble this potted illumination band into the body only there-after. In this case flexible potting material is particularly preferred. It is also possible to provide a support, for example an U-shaped channel made from metal, aluminium, plastics material, etc., supporting the LEDs and the potting material, forming together with the LEDs and the potting material an illumination band. Such illumination band can be mounted into the light profile.

Preferably, the potting material is clear like glass or water, transparent or translucent. By using a transparent potting material it is possible to completely enclose the LEDs within the potting material. It might also be preferred to not completely enclose the LEDs within the potting material but to have the illuminating side of the LEDs extending out of the potting material. In this case there is no need to use a transparent potting material.

Preferably, the potting material has a good coefficient of thermal conduction. Such potting material ensures a good dissipation of the heat produced by the LEDs into the profile material and away from the LEDs and the illumination cavity.

Preferably, the LEDs are electrically connected with an electrical power source so that individual LEDs and/or groups of LEDs can be switched separately. A control, such as a conventional microprocessor or the like, can be used for controlling such separate switching. It is possible to not only produce static illumination, but to also produce a moving or timely varying illumination. Thus a moving illumination can display the transportation direction of the people conveyor, for example by way of a moving bar or arrow.

It is also possible to dim and/or change the color of all or some of the LEDs and to have a timely varying or moving dim effect and/or color change effect.

Preferably, a bus system is provided for separately switching the LEDs. A bus system can substantially reduce the wiring for the LEDs and thus reduce space consumption in the profile.

Preferably, the U-shaped channel has a depth direction which is defined in parallel to lateral walls of the U-shaped channel in the direction from the open mouth to the base of the U, wherein the illumination cavity is an extension of the U-shaped channel in the depth direction. Using such profile shape, the LEDs can be placed and potted, respectively, in the profile with the illumination side thereof opposite to the peripheral front face of the glass balustrade. Moreover, the manufacturing of such an illumination is very simple because the LEDs can be easily mounted in such an enlarged channel.

Preferably, the U-shaped channel has a depth direction which is defined in parallel to the lateral walls of the U-shaped channel in the direction from the open mouth to the base of the U, and wherein the illumination cavity is an extension of the U-shaped channel in one of the lateral walls thereof and perpendicular to the depth direction. This construction brings the illuminating side of the LEDs into an opposed position with respect to one of the lateral surfaces of the glass panel. It is possible to angle the LEDs and possibly also the illumination cavity with respect to the depth direction of the U-shaped channel and the plane of the glass balustrade, respectively, so as to let the LEDs radiate into the glass panel with an angle between 0° and 90°, preferably between 10° and 80° and most preferred between 30° and 60° with respect to a plane of the glass panel.

Preferably, an elastic interlayer is provided between the profile and the glass balustrade along the lateral walls of the U-shaped channel and, preferably, such an interlayer is also provided between walls of the illumination cavity and the LEDs. By using such a construction, the mounting of the LEDs into the illumination cavity and particularly the potting of the LEDs therein can be used for securing such elastic interlayer within the profile. It is possible to use a translucent or transparent elastic interlayer. There is no need to provide such an interlayer between the walls of the illumination cavity and the LEDs, but it can be provided between the LEDs and the glass balustrade.

Preferably, the profile is screwed to the glass profile by means of a plurality of screws. With existing constructions the profile is fixed to the balustrade by way of spring means which are biased against the glass balustrade for fixing the profile thereon. Spring means are not easy to manufacture and to install. Typically, such spring means have to be customized for the particular application so that there are relatively expensive components. Screws can be taken from stock and are relatively inexpensive compared to such spring means.

Preferably, the profile is attached on top of the glass balustrade and forms a guide support for the handrail.

Preferably, the profile is attached to a base structure of the people conveyor and supports the glass balustrade. By using the profiles according to the present invention for supporting the glass balustrade and for supporting the handrail, illumination for the glass balustrade can be provided from the top and from the bottom so that a very high illumination intensity and equal intensity distribution over the glass balustrade can be realized.

Preferably, means for electrostatic grounding of the handrail are provided. The moving handrail is typically made of an elastomeric material which is subjected to electrostatic charging thereof. In the effect, very high voltages can be generated which might destroy the LEDs. In order to ensure prolonged lifetime of the LEDs an electrostatic grounding is preferred together with the LED illumination.

Preferably, at least a portion of the LEDs is supported on a common printed circuit board. The printed circuit board is preferably flexible. Particularly, the LEDs can be surface mounted to the printed circuit board. The printed circuit board can include the conductors for feeding the LEDs. It can further comprise data lines, for example the data bus of the bus system, and can further include 205 logic elements to be used with respect to each individual LED or groups of individual LEDs together with the bus system.

Preferably, the profile of the people conveyor is formed of a plurality of profile segments which are joined with each other in longitudinal direction of the profile and which preferably have electrical connectors provided at longitudinal ends of the profile segments for electrically connecting the profile segments with each other. Preferably, the LEDs of one profile segment are mounted on a common printed circuit board.

Preferably, the profile and the profile segment, respectively, comprise fins or ribs for increasing heat dissipation. Such fins or ribs can be provided at the outer side of the profile, i.e. the side facing the environment. They can also be provided within the illumination channel in order to increase the heat dissipation from the LEDs into the material of the profile. Even if a thermal conductive potting material is used, such internal fins or ribs can be provided in order to improve the heat transfer from the potting material to the profile material.

The invention relates in one embodiment also to a profile segment for an escalator according to the present invention comprising an U-shaped channel for engaging the glass balustrade and an illumination cavity which is preferably an extension of the U-shaped channel and in which a plurality of LEDs is arranged. It is to be noted that generally all features as described above with respect to the people conveyor and which relate to the profile apply for the profile segment as well.

Embodiments of the invention are described in greater detail below with reference to the Figures, wherein.

Figure 1:
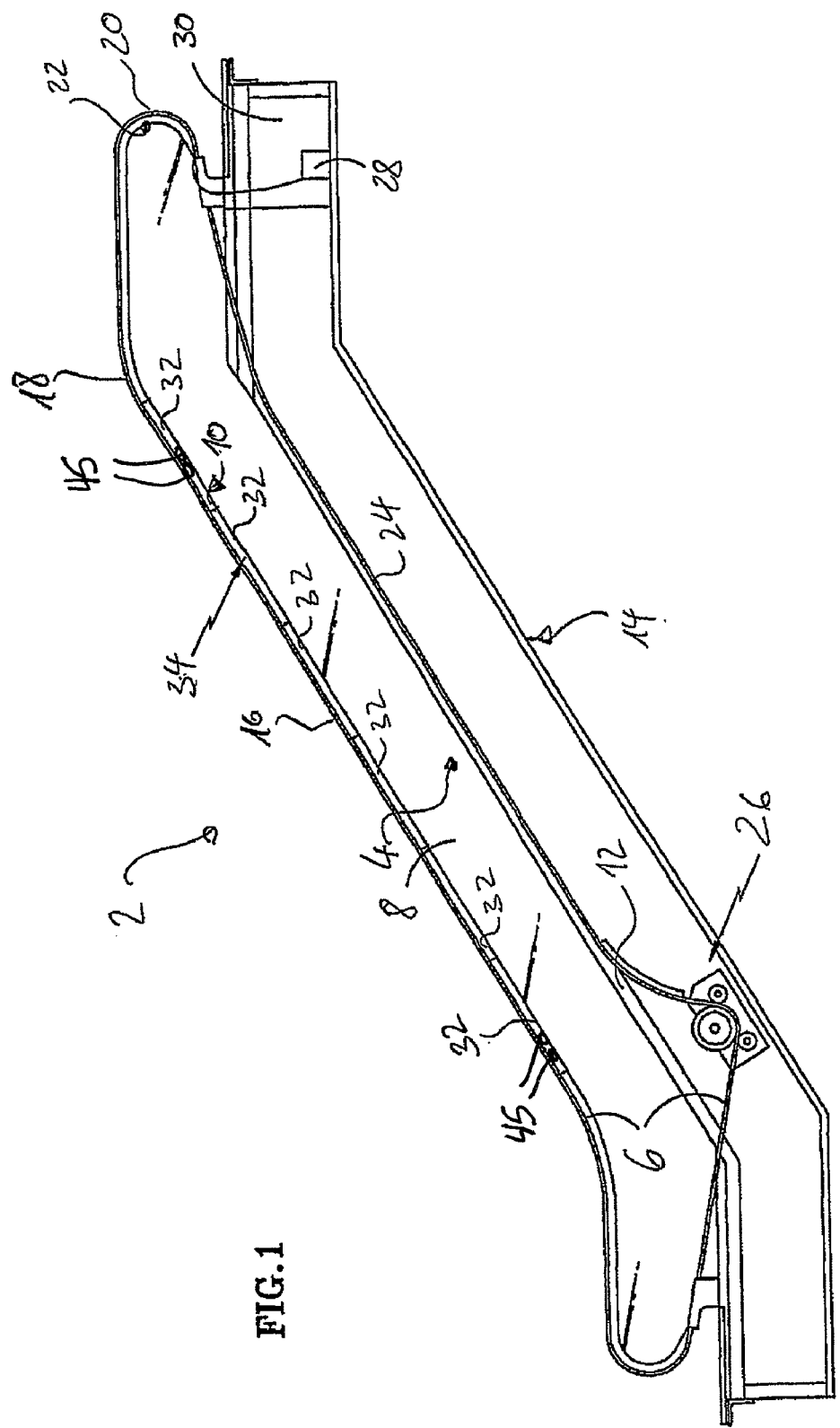
FIG. 1 shows a people conveyor having a glass balustrade illumination according to an embodiment of the present invention.

FIG. 1 shows a people conveyor 2 in accordance with an embodiment of the present invention. Particularly, the people conveyor 2 of FIG. 1 is an escalator, but the invention can also be realized with a moving walkway, etc. The people conveyor 2 has an endless people transportation band 4 made up from a plurality of steps which are arranged one next to the other. The people conveyor 2 further includes an endless handrail 6 moving in parallel with the people transportation band 4. A glass balustrade 8 is arranged laterally to the transportation band 4 and supports the handrail 6. Particularly, the handrail 6 is supported by a profile 10 which is mounted on top of the glass balustrade. Similar to the profile 10, there is a further profile 12 which is supported by the base structure 14 of people conveyor 2 and supports the glass balustrade.

As will be discussed in detail below, the glass balustrade 8 can be illuminated by an illumination arrangement which is provided in the profile 10 and/or in the profile 12. The glass balustrade 8 can be structured in a way so as to scatter the light out of the volume of the glass balustrade 8 in order to illuminate the transportation band 4 or in order to display information or for purely decorative purposes. It is possible to have such structures only in particular areas, for example in the form of an image or word which is to be displayed. But it is also possible to have such structure on the complete side surface or both side surfaces of the glass balustrade 8. The structure can be made by various techniques, for example blasting techniques like grid blasting or sand blasting. It is also possible to print such structures on the surface. Screen printing and particularly screen printing of ceramic material is most preferred at present.

As can be seen in FIG. 1, the handrail follows an endless path through an inclined area 16, a transition area 18, a newel area 20, where the handrail is guided around a newel bow 22 and then through a return path 24. In the return path a handrail drive 26 is arranged. A power source 28 for providing power for illuminating the glass balustrade 8 can be positioned in space 30 below the upper landing or at any other place within the people conveyor 2 or even outside thereof.

The profile 10 supporting the handrail 6 as well as the profile 12 supporting the balustrade 8 can be made up from a plurality of profile segments 32 which are adjacent to each other in the longitudinal direction of the profile 10.

Figure 2:
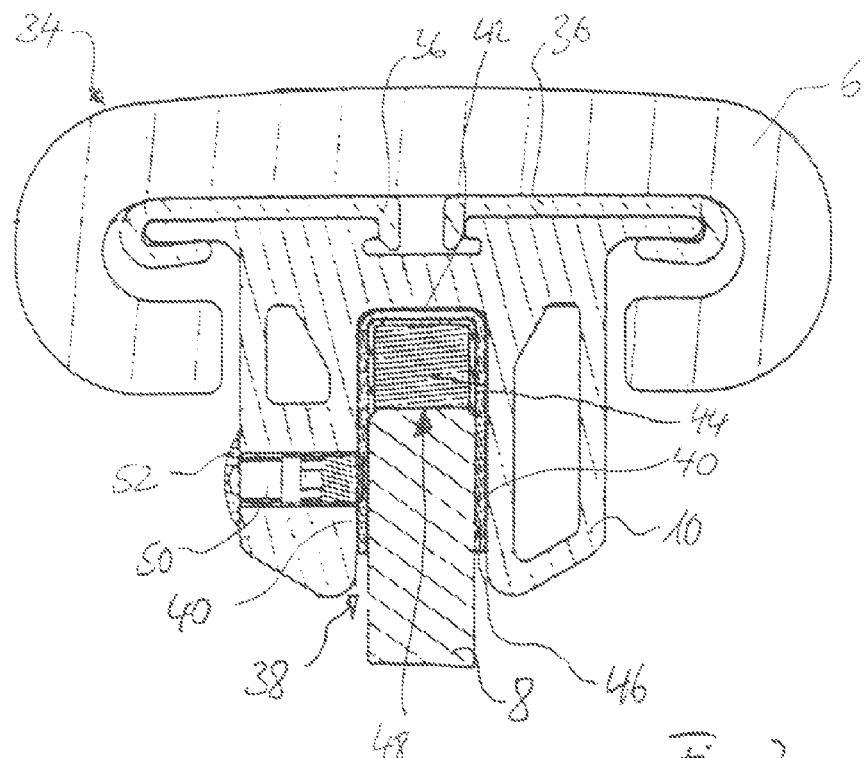
FIG. 2 is a cross section view of a profile supporting the handrail of the people conveyor and part of the glass balustrade in the inclined area of the people conveyor.

FIG. 2 is a section through the handrail arrangement 34 at any location of the handrail arrangement except the newel area 20 and the return path 24. As can be seen in FIG. 2, the handrail arrangement 34 comprises the handrail 6, made of an elastic rubber material as it is conventional, a sliding guide 36 which is supported by the profile 10. The profile 10 has an U-shaped channel 38 comprising lateral walls 40. The U of the U-shaped channel 38 is opening downwardly in the representation of FIG. 2 and has a base 42.

It is to be noted that the profile 12 also comprises an U-shaped channel and is in some respect similar to the profile 10. The profile 12 does not necessarily have any means for guiding the handrail 6. The profiles 10 and 12 are preferably made of a material having a good thermal conductivity, for example a metal, etc. Preferably, the profiles 10, 12 are extruded aluminium or aluminium alloy profiles. An illumination cavity 44 is provided in the extension of the U-shaped profile 38. A plurality of LEDs 45 is arranged in the illumination cavity 44. The LEDs are preferably those as sold by the German company Osram under the name of LBE67C POWER TOPLED or LT E67C. A potting material 43 is used for mounting the LEDs 45 into the illumination cavity. An elastic interlayer 46 is provided between the profile 10 and the glass balustrade 8. As can be seen in FIG. 2, the elastic interlayer 46 is provided along the lateral walls 40 of the U-shaped channel 38 and is also provided along the walls of the illumination cavity. In order to provide for a good thermal contact between the LEDs and the profile 10 and particularly between the potting material and the profile 10, it is possible to provide openings in the elastic interlayers 46 at least in the area of the illumination cavity in order to make sure that any heat developed by the LEDs, etc., will be dissipated through the interlayer 46 and into the profile 10.

A further option for reducing the temperature as generated by the illumination in the lighting profile 42, a conductor having a relatively large cross sectional area can be used for supplying power to the individual LEDs 45. A wire of the type lapp canel, oelflid 191, 3G 1.5 mm/16AWG has been found suitable. A power supply can be provided for supplying power to the LEDs 45 and for controlling the illumination colour, intensity, etc.) of the LEDs 45. If a plurality of stairs needs to be controlled, for example in unison within a building, one power supply can be configured as Master controller. The Master controller or any other power supply can control the colours via pre-set values or a PC program, static or dynamic.

In the representation of FIG. 2, the light as generated by the LEDs is directed through an edge or peripheral front surface 48 of the balustrade 8 into the volume of the balustrade 8.

The glass balustrade has a typical width of 10 mm. Preferably, the illumination band as formed by the LEDs has substantially the same width as the glass balustrade.

The profile 10 is fixed to the glass balustrade 8 by way of screws 50 and preferably by way of self-cutting headless screws 50. The screw opening may be covered by cover 52.

Figure 3:
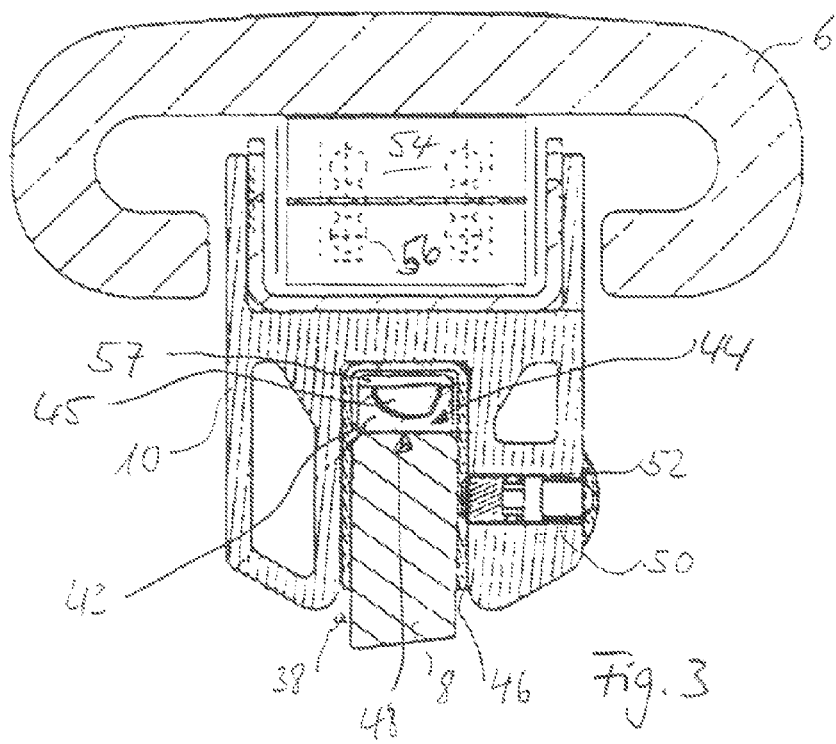
FIG. 3 shows a sectional view similar to that of FIG. 2 of the profile in the newel bow of the people conveyor.

FIG. 3 is a sectional view similar to that of FIG. 2, but is taken in the area of the newel bow 22. In order to reduce friction between the handrail 6 and the newel bow 22, rollers 54 are journaled in the profile 10. Particularly, such rollers can be made of metallic material, for example copper, and it is possible to ground such rollers in order to avoid electrostatic charging of the handrail 6. Roller bearings 56 are schematically shown within the envelope of the roller 54.

The LEDs 45 are preferably mounted to a flexible printed circuit board 57 which extends along the length of the illumination cavity 44. A data bus can be provided on such printed circuit board 57 or separately therefrom in addition to the conductors feeding electrical power to the LEDs 45. The data bus can be connected with individual LEDs 45 and/or groups of LEDs 45 in order to separately illuminate such individual LEDs 45 or groups of LEDs 45. To this effect, for each individual LED 45 or for each group of LEDs 45 a data decoder is provided. The data decoder can be integrally formed on the printed circuit board or can be integrally formed with the LED 45, but can also be surface mounted to the printed circuit board or be individually connected with the data bus and the LED(s) 45. Associated to the data decoder a switching means can be provided for switching power to the respective LED 45 or groups of LEDs 45 in case that the information on the data bus requires illumination thereof. Any other circuitry or conductor arrangement can be used for individually or groupwise switching LEDs 45 on and off.

By using such individual or groupwise controller of the LEDs 45, it is possible to have localised illumination on the glass balustrade 8 or illumination which moves along the glass balustrade 8, for example in unison with the movement of a passenger standing on the transportation band 4, etc.

The invention claimed is:

1. A people conveyor, comprising:
    a people transportation band;
    a handrail;
    a plurality of illumination sources arranged along the transportation band;
    a control associated with the illumination sources, the control causing operation of the illumination sources to produce illumination that moves along the transportation band;
    a glass balustrade arranged laterally to the transportation band and supporting the handrail; and
    a profile for engaging the glass balustrade, the profile having a channel, a portion of the balustrade including an edge of the glass balustrade being received in the channel, an illumination cavity being disposed between an interior surface of the channel and the edge of the glass balustrade, wherein the plurality of illumination sources is arranged in the illumination cavity to project light through the edge of the glass balustrade, wherein the channel has a depth direction which is defined in parallel to lateral walls of the channel in a direction from an open mouth to a base of the channel, and wherein the illumination cavity is an extension of the channel in one of the lateral walls and the illumination cavity extends in a direction perpendicular to the depth direction.

2. The people conveyor of claim 1, wherein the controller controls the illumination to provide a moving illumination that displays a transportation direction of the people conveyor.

3. The people conveyor of claim 1, wherein the controller controls the illumination so that the illumination moves along the transportation band in unison with movement of a passenger standing on the transportation band.

4. The people conveyor of claim 3, wherein the controller controls switching of the illumination sources so that individual illumination sources or groups of selected ones of the illumination sources are switched separately.

5. The people conveyor of claim 1, wherein the illumination sources comprise light emitting diodes (LEDs).

6. The people conveyor of claim 1, wherein the controller controls the illumination to produce a timely varying illumination.

7. The people conveyor of claim 1, wherein the controller controls the illumination to change a brightness of the illumination.

8. The people conveyor of claim 7, wherein the controller controls the illumination to have a timely varying effect of the change in the brightness of the illumination.

9. The people conveyor of claim 1, wherein the controller controls the illumination to change a color of at least some of the illumination sources.

10. The people conveyor of claim 9, wherein the controller controls the illumination to have a timely varying color change effect.

11. The people conveyor of claim 9, wherein the controller controls the illumination to have a moving color change effect.

12. The people conveyor of claim 1, including a power supply for the illumination sources.

13. The people conveyor of claim 1, wherein the channel has a depth direction which is defined in parallel to lateral walls of the channel in a direction from an open mouth to a base of the channel, and wherein the illumination cavity is an extension of the channel in the depth direction.

14. The people conveyor of claim 13, comprising an elastic interlayer between the profile and the glass balustrade along lateral walls of the channel and wherein the elastic interlayer is also provided between walls of the illumination cavity and the illumination sources.

15. A people conveyor, comprising:
    a people transportation band;
    a handrail;
    a plurality of illumination sources arranged along the transportation band;
    a control associated with the illumination sources;
    a glass balustrade beneath the handrail; and
    a profile for engaging the glass balustrade, the profile having a channel, a portion of the balustrade including an edge of the glass balustrade being received in the channel, an illumination cavity being disposed between an interior surface of the channel and the edge of the glass balustrade, wherein the plurality of illumination sources is arranged in the illumination cavity to project light through the edge of the glass balustrade, wherein the channel has a depth direction which is defined in parallel to lateral walls of the channel in a direction from an open mouth to a base of the channel, and wherein the illumination cavity is an extension of the channel in one of the lateral walls and the illumination cavity extends in a direction perpendicular to the depth direction.

* * * * *